United States Patent
Dworakowski et al.

(10) Patent No.: US 11,113,843 B2
(45) Date of Patent: Sep. 7, 2021

(54) METHOD FOR CALIBRATING THE ORIENTATION OF A CAMERA MOUNTED TO A VEHICLE

(71) Applicant: Aptiv Technologies Limited, St. Michael (BB)

(72) Inventors: Waldemar Dworakowski, Cracow (PL); Krzysztof Gongolewski, Cracow (PL); Rafal Dlugosz, Poznan (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 15/779,895

(22) PCT Filed: Nov. 17, 2016

(86) PCT No.: PCT/EP2016/078007
§ 371 (c)(1),
(2) Date: May 30, 2018

(87) PCT Pub. No.: WO2017/093036
PCT Pub. Date: Jun. 8, 2017

(65) Prior Publication Data
US 2018/0357791 A1    Dec. 13, 2018

(30) Foreign Application Priority Data
Nov. 30, 2015   (EP) .................................... 15196967

(51) Int. Cl.
*G06T 7/80*      (2017.01)
*G06T 7/73*      (2017.01)
(52) U.S. Cl.
CPC . *G06T 7/80* (2017.01); *G06T 7/74* (2017.01)
(58) Field of Classification Search
CPC .... G06T 7/80; G06T 7/73; G06T 7/74; G06T 2207/20076; G06T 2207/30252
(Continued)

(56) References Cited

U.S. PATENT DOCUMENTS

| | | | |
|---|---|---|---|
| 5,982,912 | A | 11/1999 | Fukui et al. |
| 6,292,171 | B1 | 9/2001 | Fu et al. |

(Continued)

FOREIGN PATENT DOCUMENTS

| | | |
|---|---|---|
| CN | 103035005 | 4/2013 |
| CN | 104517283 | 4/2015 |

(Continued)

OTHER PUBLICATIONS

"Corrected Notice of Allowability", U.S. Appl. No. 15/779,904, dated Nov. 18, 2020, 2 pages.
(Continued)

*Primary Examiner* — Helen Shibru
(74) *Attorney, Agent, or Firm* — Colby Nipper PLLC

(57) ABSTRACT

Calibrating the orientation of a camera mounted to a vehicle includes providing calibration pattern defining at least two horizontal lines and two vertical lines; acquiring an image of the calibration pattern by means of the camera, the image having a first axis and a second axis corresponding to a horizontal axis and a vertical axis, respectively; identifying the horizontal lines and the vertical lines within the image; determining a horizontal vanishing point from the representations of the horizontal lines; determining a vertical vanishing point from the representations of the vertical lines; calculating a roll angle from the location of the horizontal vanishing point based on the image, calculating a yaw angle from a first coordinate of the horizontal vanishing point measured along the first axis, and calculating a pitch angle from a second coordinate of the vertical vanishing point measured along the second axis.

18 Claims, 2 Drawing Sheets

(58) Field of Classification Search
USPC .......................................................... 348/95
See application file for complete search history.

(56) References Cited

U.S. PATENT DOCUMENTS

| | | | |
|---|---|---|---|
| 6,915,072 | B2 | 7/2005 | Takahashi et al. |
| 8,295,588 | B2 | 10/2012 | Fujieda |
| 9,319,667 | B2 | 4/2016 | Lin et al. |
| 9,441,958 | B2 | 9/2016 | Hara |
| 9,739,603 | B2 | 8/2017 | Hara |
| 10,218,961 | B2 | 2/2019 | Kishiwada et al. |
| 10,776,953 | B2 | 9/2020 | Dworakowski et al. |
| 10,872,267 | B2 | 12/2020 | Dlugosz et al. |
| 10,902,640 | B2 | 1/2021 | Dlugosz et al. |
| 2002/0044676 | A1 | 4/2002 | Wei et al. |
| 2004/0225472 | A1 | 11/2004 | Kraft |
| 2005/0068308 | A1 | 3/2005 | Simard et al. |
| 2006/0215031 | A1* | 9/2006 | Krahnstoever ........... G06T 7/80 348/187 |
| 2006/0288325 | A1 | 12/2006 | Miyamoto et al. |
| 2006/0289757 | A1 | 12/2006 | Kochi et al. |
| 2007/0047940 | A1 | 3/2007 | Matsumoto et al. |
| 2008/0080744 | A1 | 4/2008 | Tanaka |
| 2008/0095445 | A1 | 4/2008 | Brandt |
| 2008/0170228 | A1 | 7/2008 | Jiang |
| 2008/0204670 | A1* | 8/2008 | Furui ................... H04N 9/3194 353/69 |
| 2009/0231374 | A1 | 9/2009 | Van De Wynckel et al. |
| 2009/0299684 | A1 | 12/2009 | Imanishi et al. |
| 2010/0134634 | A1 | 6/2010 | Watt |
| 2010/0217416 | A1 | 8/2010 | Murabata |
| 2010/0232681 | A1 | 9/2010 | Fujieda et al. |
| 2010/0295948 | A1 | 11/2010 | Xie et al. |
| 2010/0315601 | A1* | 12/2010 | Furui ................... H04N 9/3194 353/70 |
| 2011/0069284 | A1* | 3/2011 | Furui ................... H04N 9/3185 353/70 |
| 2011/0234759 | A1 | 9/2011 | Yamaya et al. |
| 2011/0300939 | A1 | 12/2011 | Mao et al. |
| 2011/0321084 | A1 | 12/2011 | Takahashi et al. |
| 2012/0033087 | A1 | 2/2012 | Takeda et al. |
| 2012/0212627 | A1 | 8/2012 | Klose |
| 2012/0230600 | A1 | 9/2012 | Tsai et al. |
| 2012/0233841 | A1* | 9/2012 | Stein ...................... G03B 17/02 29/428 |
| 2012/0327220 | A1* | 12/2012 | Ma ........................ G06T 3/4038 348/135 |
| 2013/0051664 | A1 | 2/2013 | Fujita et al. |
| 2013/0216153 | A1 | 8/2013 | Hsu |
| 2014/0043473 | A1* | 2/2014 | Gupta .................. H04N 17/002 348/135 |
| 2014/0293299 | A1 | 10/2014 | Ozawa |
| 2015/0049193 | A1* | 2/2015 | Gupta .................. H04N 17/002 348/148 |
| 2015/0078675 | A1 | 3/2015 | Tian et al. |
| 2015/0245020 | A1 | 8/2015 | Meier et al. |
| 2015/0287215 | A1 | 10/2015 | Ohba et al. |
| 2015/0363921 | A1 | 12/2015 | Baek et al. |
| 2016/0180176 | A1 | 6/2016 | Yamamoto |
| 2017/0177973 | A1 | 6/2017 | Hu |
| 2017/0316557 | A1 | 11/2017 | Inoue |
| 2017/0345321 | A1 | 11/2017 | Cross et al. |
| 2018/0080766 | A1* | 3/2018 | Johnson ................ G02B 26/10 |
| 2018/0080787 | A1 | 3/2018 | Laine et al. |
| 2018/0122099 | A1 | 5/2018 | Lee |
| 2018/0170540 | A1 | 6/2018 | Claybrough |
| 2018/0197276 | A1 | 7/2018 | Kim et al. |
| 2018/0322656 | A1 | 11/2018 | Dworakowski et al. |
| 2018/0357509 | A1 | 12/2018 | Dlugosz et al. |
| 2019/0266752 | A1 | 8/2019 | Dlugosz et al. |
| 2019/0266753 | A1 | 8/2019 | Dworakowski et al. |

FOREIGN PATENT DOCUMENTS

| | | |
|---|---|---|
| CN | 104539925 | 4/2015 |
| CN | 104715473 | 6/2015 |
| DE | 102004033468 | 12/2005 |
| EP | 2437495 | 11/2016 |
| EP | 3125196 | 2/2017 |
| EP | 3173979 | 5/2017 |
| EP | 3179462 | 6/2017 |
| GN | 102171067 | 8/2011 |
| JP | 2013052784 | 3/2013 |

OTHER PUBLICATIONS

"Extended European Search Report", EP Application No. 15196969. 8, dated May 9, 2016, 5 pages.
"Final Office Action", U.S. Appl. No. 15/779,880, dated Mar. 23, 2020, 10 pages.
"Final Office Action", U.S. Appl. No. 15/779,904, dated Apr. 14, 2020, 10 pages.
"International Preliminary Report on Patentability", Application No. PCT/EP2016/078006, dated Jun. 14, 2018, 7 pages.
"International Search Report and Written Opinion", Application No. PCT/EP2016/078006, dated Jan. 3, 2017, 8 pages.
"Non-Final Office Action", U.S. Appl. No. 16/266,268, dated Jul. 29, 2020, 7 pages.
"Non-Final Office Action", U.S. Appl. No. 16/266,555, dated Sep. 24, 2020, 27 pages.
"Non-Final Office Action", U.S. Appl. No. 15/779,904, dated Oct. 25, 2019, 6 pages.
"Non-Final Office Action", U.S. Appl. No. 15/779,880, dated Dec. 11, 2019, 11 pages.
"Notice of Allowance", U.S. Appl. No. 15/779,880, dated May 13, 2020, 10 pages.
"Notice of Allowance", U.S. Appl. No. 15/779,904, dated Jul. 15, 2020, 8 pages.
"Notice of Allowance", U.S. Appl. No. 15/779,904, dated Oct. 8, 2020, 8 pages.
"Notice of Allowance", U.S. Appl. No. 16/266,268, dated Oct. 15, 2020, 5 pages.
Bay, et al., "Speeded-Up Robust Features (SURF)", Jun. 2008, pp. 346-359, 14 pages.
Lu, et al., "Fast and Globally Convergent Pose Estimation from Video Images", retrieved from https://ieeexplore.ieee.org/document/ 862199, Jun. 2000, 13 pages.
"Final Office Action", U.S. Appl. No. 16/266,555, dated Jan. 28, 2021, 23 pages.
"Notice of Allowance", U.S. Appl. No. 16/266,268, dated Nov. 23, 2020, 5 pages.
"Supplemental Notice of Allowance", U.S. Appl. No. 16/266,268, dated Dec. 23, 2020, 2 pages.
Theiler, et al., "Automatic Registration of Terrestrial Laser Scanner Point Clouds using Natural Planar Surfaces", Jul. 2012, 6 pages.
Turk, "Zippered Polygon Meshes from Range Image", Jul. 1994, 8 pages.
"Foreign Office Action", CN Application No. 201680069618.0, dated Mar. 3, 2021, 6 pages.
"Foreign Office Action", EP Application No. 18159313.8, dated May 25, 2021, 6 pages.
"Non-Final Office Action", U.S. Appl. No. 16/266,555, dated Apr. 29, 2021, 24 pages.
Liu, et al., "Robust Camera Calibration by Optimal Localization of Spatial Control Points", Dec. 2014, pp. 3076-3087.

* cited by examiner

METHOD FOR CALIBRATING THE ORIENTATION OF A CAMERA MOUNTED TO A VEHICLE

TECHNICAL FIELD OF INVENTION

The invention relates to a method for calibrating the orientation of a camera mounted to a vehicle.

BACKGROUND OF INVENTION

Recently, an increasing number of vehicles are provided with at least one camera mounted to the vehicle for capturing information about an environment of the vehicle. In particular, the camera is located at a front of the vehicle for acquisition of the road ahead. Image data thus obtained can then be used by various driver assistance systems, for example.

From images acquired by such a camera spatial data about objects within the field of view of the camera can be extracted. However, this data are relative to the camera, but not (at least not directly) to the vehicle. Hence, for example positions of objects captured by the camera can only be determined with respect to the camera. To also obtain from images acquired by the camera the positions of such objects relative to the vehicle with high precision and reliability, it is therefore important to precisely know the position and orientation of the camera relative to the vehicle.

Especially placing the camera with a well-defined orientation relative to the vehicle is rather difficult. Therefore, the camera will almost certainly deviate from an ideal orientation, with the real orientation varying for different cameras in different vehicles.

The orientation of the camera can be described by three angles commonly referred to as roll angle, yaw angle and pitch angle. The roll angle specifies the angle of rotation around a longitudinal axis, which for a camera in particular corresponds to an optical axis of the camera. Hence, the axis of rotation of the roll angle is defined relative to the camera and therefore changes its orientation together with the camera, for example if the camera is tilted or panned. The yaw angle specifies an angle of rotation around a vertical axis and thus, at least essentially, defines deviations from the ideal orientation to the left or to the right. The pitch angle specifies an angle of rotation around a horizontal axis and thus, at least essentially, defines deviations from the ideal orientation to the top or to the bottom.

Calibrating the orientation of a camera mounted to a vehicle preferably comprises determining at least one of the roll angle, the yaw angle and the pitch angle. Preferentially all three of these are determined so as to fully describe the orientation of the camera.

Determining these angles can generally be done during movement of the vehicle, for example while driving on a road. In this way, the calibration method can take advantage from information which can be derived from differences between consecutively acquired images due to the movement in a specific direction. Such a calibration, however, can be time-consuming and therefore costly. Because of this, a calibration method which can be executed on a stationary vehicle can be preferable.

There are calibration methods which depend on the height of the camera being known and fixed. However, in particular if the vehicle is a truck, the height of the camera, even though mounted to a defined location at the vehicle, can change significantly. This can be due to a rather soft suspension of the vehicle, as a result of which a driver cabin of the vehicle, to which the camera might be mounted, can change its height by up to several tens of centimeters, for example. It is therefore preferred that the calibration method does not depend on the height of the mounted camera. Preferentially, the height of the camera can even be determined as part of the calibration.

It is an objective of the invention to provide a method for calibrating the orientation of a camera mounted to a vehicle which is in particular reliable, quick and independent of the height of the mounted camera.

SUMMARY OF THE INVENTION

This objective is solved by a method in accordance with claim 1.

For calibrating the orientation of the camera, the camera is placed in front of a calibration pattern, especially at a known distance to the calibration pattern. This corresponds to a stationary setup and can for example easily be achieved with a calibration pattern which is fixedly placed. For example, the vehicle can be moved to a defined place, especially at a known distance, in front of the calibration pattern. For this, the vehicle can be driven to this defined place. However, to place the vehicle with high precision, the vehicle is preferably moved by a conveyor.

Said known distance of the vehicle to the calibration pattern can be predefined and is then at least essentially the same for successive vehicles having cameras to be calibrated. However, the distance can also change, preferably in a controlled manner, and/or be measured individually for every calibration or a group of calibrations. The distance especially is a distance in a direction perpendicular to a plane of the calibration pattern.

In particular, while the orientation of the camera relative to the calibration pattern is unknown and to be calibrated, the orientation of the vehicle to the calibration pattern is preferably known, especially predefined or at least precisely measurable.

The calibration pattern defines at least two horizontal lines and two vertical lines. In particular, the calibration pattern is a flat arrangement of graphical symbols, with a plane of the calibration pattern preferentially being vertical. The calibration pattern does not necessarily comprise the horizontal and vertical lines as graphically depicted lines. Instead, the lines can also be defined by one or more symbols from which a respective line can be derived unambiguously.

According to an embodiment, the calibration pattern comprises at least a first characteristic point, a second characteristic point, a third characteristic point and a fourth characteristic point. One of the two horizontal lines can then be defined by the first and second characteristic points and the other one of the two horizontal lines can be defined by the third and fourth characteristic points. Similarly, one of the two vertical lines can then be defined by the first and third characteristic points and the other one of the two vertical lines can be defined by the second and fourth characteristic points.

By means of the camera, an image of the calibration pattern is acquired. Such an image in particular comprises a plurality of pixels arranged in lines and columns with each pixel having a color and brightness such that the pixels together represent a projection of the field of view of the camera through a lens of the camera to an image sensor of the camera. Hence, if the calibration pattern is within the field of view of the camera, the image contains a representation of the calibration pattern.

The image has a first axis and a second axis at least essentially corresponding to a horizontal axis and a vertical axis, respectively. For example, the first axis is parallel to said lines of pixels and the second axis is parallel to said columns of pixels. Depending on the orientation of the camera, which is to be determined, the first and second axes might not correspond exactly to horizontal and vertical axes, respectively.

The acquired image might be corrected for distortions due to the optics of the camera, especially a lens or a lens system of the camera. Such a correction of distortions can be executed according to any known method sufficiently reliable.

Within the acquired image, representations of the horizontal lines and the vertical lines are identified. This can be done, for example, by identifying representations of the graphical symbols of the calibration pattern which define the horizontal and vertical lines. For example, representations of said characteristic points defining the horizontal and vertical lines can be identified within the image by a suitable algorithm.

Although the horizontal lines of the calibration pattern as well as the vertical lines of the calibration pattern are parallel to each other, the representations of the horizontal lines as well as the representations of the vertical lines within the acquired image will, as a rule, not be parallel to each other. This is because, even after correction of possible distortions, the parallelism is only preserved if the optical axis of the camera is perfectly perpendicular to the horizontal lines or the vertical lines, respectively, which usually will not be the case.

A horizontal vanishing point is determined from the representations of the horizontal lines. Similarly, a vertical vanishing point is determined from the representations of the vertical lines.

According to an embodiment, determining the horizontal and/or the vertical vanishing point from the representations of the horizontal and/or vertical lines comprises determining a point of intersection of the horizontal and/or vertical lines, respectively. To determine such a vanishing point, it might be necessary to graphically or mathematically extrapolate continuations of the lines until they intersect. Should the lines defining a respective vanishing point be exactly parallel, they will not intersect and a coordinate of the vanishing point will be infinity. In such an exceptional case, the coordinate of the vanishing point actually being infinity can be defined as having a maximum value great enough so as to lead to only insignificant errors in the determination of the roll angle, yaw angle or pitch angle.

After determining the horizontal and vertical vanishing points, at least one of the roll angle, the yaw angle and the pitch angle is calculated.

If the roll angle is calculated, it is calculated from the location of the horizontal vanishing point relative to a principal point of the image. This principle point is in particular located at the center of the image and/or corresponds to the point where the optical axis of the camera crosses the image plane.

According to an embodiment, calculating the roll angle comprises determining the angle of the line segment defined by the horizontal vanishing point and the principal point of the image with respect to the first axis. This is in particular done by calculating the inverse tangent of the quotient of a second coordinate of the horizontal vanishing point measured along the second axis and a first coordinate of the horizontal vanishing point measured along the first axis. This can be written as $\gamma=\arctan(yH/xH)$, with $\gamma$ being the roll angle and yH and xH being the first and second coordinates of the horizontal vanishing point.

If the yaw angle is calculated, it is calculated from the first coordinate of the horizontal vanishing point.

According to an embodiment, calculating the yaw angle in particular comprises calculating the inverse tangent of the quotient of a focal length of the camera and the product of a pixel pitch of the camera and the first coordinate of the horizontal vanishing point. The pixel pitch is the distance between the sensor pixels of a sensor of the camera corresponding to the pixels of the image acquired by the camera. The pixel pitch in direction of the first axis might differ from the pixel pitch in direction of the second axis. In such a case, the yaw angle is preferably calculated from the pixel pitch in direction of the first axis. Hence, the calculation can be written as $\beta=\arctan(f/(\Delta xP \cdot xH))$, with $\beta$ being the yaw angle, f being the focal length of the camera, $\Delta xP$ being the pixel pitch in direction of the first axis and xH being the first coordinate of the horizontal vanishing point.

If the camera is oriented with a roll angle not equal to zero, the position of the vanishing point is preferably corrected for displacement due to the rolled orientation of the camera. Therefore, according to a preferred embodiment, calculating the yaw angle comprises calculating the inverse tangent of the quotient of a focal length of the camera and the product of a pixel pitch of the camera and the first coordinate of a corrected horizontal vanishing point. This corrected horizontal vanishing point is determined by rotating the horizontal vanishing point around the principal point of the image by the negative of the roll angle. In this way, the effect of rolling is reversed and the horizontal vanishing point is quasi unrolled. Calculation of the yaw angle can then be written as $\beta=\arctan(f/(\Delta xP \cdot xHR))$, with xHR being the first coordinate of the corrected horizontal vanishing point.

In particular, the first coordinate of the corrected horizontal vanishing point is calculated as the difference of the product of the first coordinate of the horizontal vanishing point and the cosine of the negative of the roll angle to the product of the second coordinate of the horizontal vanishing point and the sine of the negative of the roll angle. This can be written as $xHR=xH\cos(-\gamma)-yH\sin(-\gamma)$ and corresponds to a rotation around a coordinate origin of the image where the first and second axes intersect. Hence, for this formula to be used, the principal point of the image preferably corresponds to the coordinate origin of the image.

If the camera is oriented with a pitch angle not equal to zero, and the pitch angle has been determined before the yaw angle, it might be necessary to correct the yaw angle for the pitch. According to an embodiment, this can be done by calculating a corrected yaw angle as the inverse tangent of the quotient of the tangent of the previously calculated yaw angle and the cosine of the pitch angle. This can be written as $\beta'=\arctan(\tan\beta/\cos\alpha)$, with $\alpha$ being the pitch angle, $\beta$ being the yaw angle prior to correction and $\beta'$ being the yaw angle after correction.

If the pitch angle is calculated, it is calculated from the second coordinate of the vertical vanishing point.

According to an embodiment, calculating the pitch angle in particular comprises calculating the inverse tangent of the quotient of a focal length of the camera and the product of a pixel pitch of the camera and the second coordinate of the vertical vanishing point. If the pixel pitch in direction of the first axis differs from the pixel pitch in direction of the second axis, the pitch angle is preferably calculated from the pixel pitch in direction of the second axis. Hence, the calculation can be written as $\alpha=\arctan(f/(\Delta yP \cdot yV))$, with a being the pitch angle, f being the focal length of the camera, $\Delta yP$ being the pixel pitch in direction of the second axis and yV being the second coordinate of the vertical vanishing point.

To take into account a displacement of the vertical vanishing point due to a non-zero roll angle of the camera, according to a preferred embodiment, calculating the pitch angle comprises calculating the inverse tangent of the quotient of a focal length of the camera and the product of a pixel pitch of the camera and the second coordinate of a corrected vertical vanishing point. This corrected vertical vanishing point is determined by rotating the vertical vanishing point around the principal point of the image by the negative of the roll angle. In this way, the effect of rolling is reversed and the vertical vanishing point is quasi unrolled. Calculation of the pitch angle can then be written as $\alpha = \arctan(f/(\Delta yP \cdot yVR))$, with yVR being the second coordinate of the corrected vertical vanishing point.

In particular, the second coordinate of the corrected vertical vanishing point is calculated as the sum of the product of the first coordinate of the vertical vanishing point and the sine of the negative of the roll angle and the product of the second coordinate of the vertical vanishing point and the cosine of the negative of the roll angle. This can be written as $yVR = xV \sin(-\gamma) + yV \cos(-\gamma)$ and corresponds to a rotation around a coordinate origin of the image where the first and second axes intersect. Hence, for this formula to be used, the principal point of the image preferably corresponds to the coordinate origin of the image.

If the camera is oriented with a yaw angle not equal to zero, and the yaw angle has been determined before the pitch angle, it might be necessary to correct the pitch angle for the yaw. According to an embodiment, this can be done by calculating a corrected pitch angle as the inverse tangent of the quotient of the tangent of the previously calculated pitch angle and the cosine of the yaw angle. This can be written as $\alpha' = \arctan(\tan \alpha / \cos \beta)$, with $\beta$ being the yaw angle, $\alpha$ being the pitch angle prior to correction and $\alpha'$ being the pitch angle after correction.

For an improved determination of the horizontal and/or vertical vanishing point, according to a preferred embodiment, the calibration pattern defines more than two horizontal lines and/or more than two vertical lines. Then, it is possible to choose representations of those two horizontal and/or vertical lines for determining the horizontal or vertical vanishing point, respectively, which can be identified most easily or most reliably within the acquired image. Furthermore, it is then also possible to identify within the acquired image representations of more than two horizontal and/or vertical lines, especially of all horizontal and/or vertical lines defined by the calibration pattern, and to determine the horizontal and/or vertical vanishing point from all of these respective representations.

For example, with more than two horizontal and/or vertical lines, for each pair of two of these lines, the point of intersection of the two lines can be determined, and the horizontal or vertical vanishing point, respectively, can then be defined as an average or center of gravity of the determined points of intersection. By this, random errors in determining the vanishing points can be prevented.

To further improve precision and reliability of the calibration, part of the method can be executed repeatedly with final calibration results being obtained from individual calibration results by averaging. According to such an embodiment, the steps of acquiring the image of the calibration pattern, of identifying representations of the horizontal and vertical lines, of determining the horizontal and the vertical vanishing points and of calculating at least one of the roll angle, the yaw angle and the pitch angle are executed repeatedly such that at least one of a set of roll angles, a set of yaw angles and a set of pitch angles is obtained. The method for calibrating the orientation of the camera then further comprises the step of calculating at least one of an averaged roll angle, an averaged yaw angle and an averaged pitch angle by averaging the angles of the set of roll angles, the set of yaw angles or the set of pitch angles, respectively. Averaging in particular comprises calculating arithmetic means or medians of the angles of a respective set of angles. By averaging over multiple angles, the risk of random errors can be substantially reduced.

Especially after the roll angle, the yaw angle and/or the pitch angle of the camera have been determined, it is possible to also extract information about the position of the camera. Hence, in a preferred embodiment, calculation of at least one of the roll angle, the yaw angle and the pitch angle is followed by the step of determining a lateral offset of the camera relative to the calibration pattern and/or a height of the camera. This is done by first correcting the acquired image for at least one of roll, yaw and pitch, preferably for all of these. Such a correction in particular comprises rotating and/or shifting the image by amounts corresponding to the roll angle, the yaw angle and the pitch angle, respectively. Then, within the image a first coordinate difference and/or a second coordinate difference between the principal point of the image and a representation of a reference point of the calibration pattern is determined, wherein the reference point has a known horizontal and/or vertical position. By this, pixel distances between the principal point of the image and the representation of the reference point are obtained along both axes of the image.

For knowing the real distances, i.e. in particular the distances between a projection of the principal point to a plane of the calibration pattern and the reference point, the coordinate distances have to be scaled so as to reflect the real distances. Therefore, the lateral offset and/or the height of the camera is/are determined by scaling the first coordinate difference and/or the second coordinate difference with a factor obtained by multiplying the distance of the camera to the calibration pattern with the quotient of a pixel pitch of the camera and a focal length of the camera. This converts the coordinate distances to real distances from the reference point. The offset and height of the camera can then be derived from these distances and the known horizontal and vertical position of the reference point, respectively.

The distance of the camera to the calibration pattern can be predefined or measured. Alternatively, also the distance of the camera to the calibration pattern can be deduced from the image of the calibration pattern, if for example a distance between two characteristic points of the calibration pattern is known. In particular, the ratio between the pixel distance of the representations of these two characteristic points in the image and their real distance can correspond to the product of the distance of the camera to the calibration pattern and the quotient of the pixel pitch and the focal length of the camera. This relation can then be solved for the distance of the camera to the calibration pattern.

The presented method of calibration does not require movement of the vehicle the camera is mounted to. Instead the vehicle preferably stands still in front of the calibration pattern. This can be achieved especially well during production of the vehicle. According to a preferred embodiment, the step of placing the camera in front of the calibration pattern is therefore executed at the end of a production line which the vehicle the camera is mounted to has run through for its production. This also allows for defined lighting conditions which, in particular, are such that a sharp image of the calibration pattern can be acquired with high contrast.

The objective of the invention is furthermore solved by a computer program product. The computer program of the computer program product can be executed directly on the camera, for example. To this purpose the camera can comprise a computing device such as a microcontroller or any kind of embedded system. After determining the orientation and possibly also the height and/or lateral offset of the camera, the obtained values can be stored on a memory device which preferably is integrated in the camera.

BRIEF DESCRIPTION OF DRAWINGS

The present invention will now be described, by way of example with reference to the accompanying drawings, in which.

DETAILED DESCRIPTION

Figure 1:
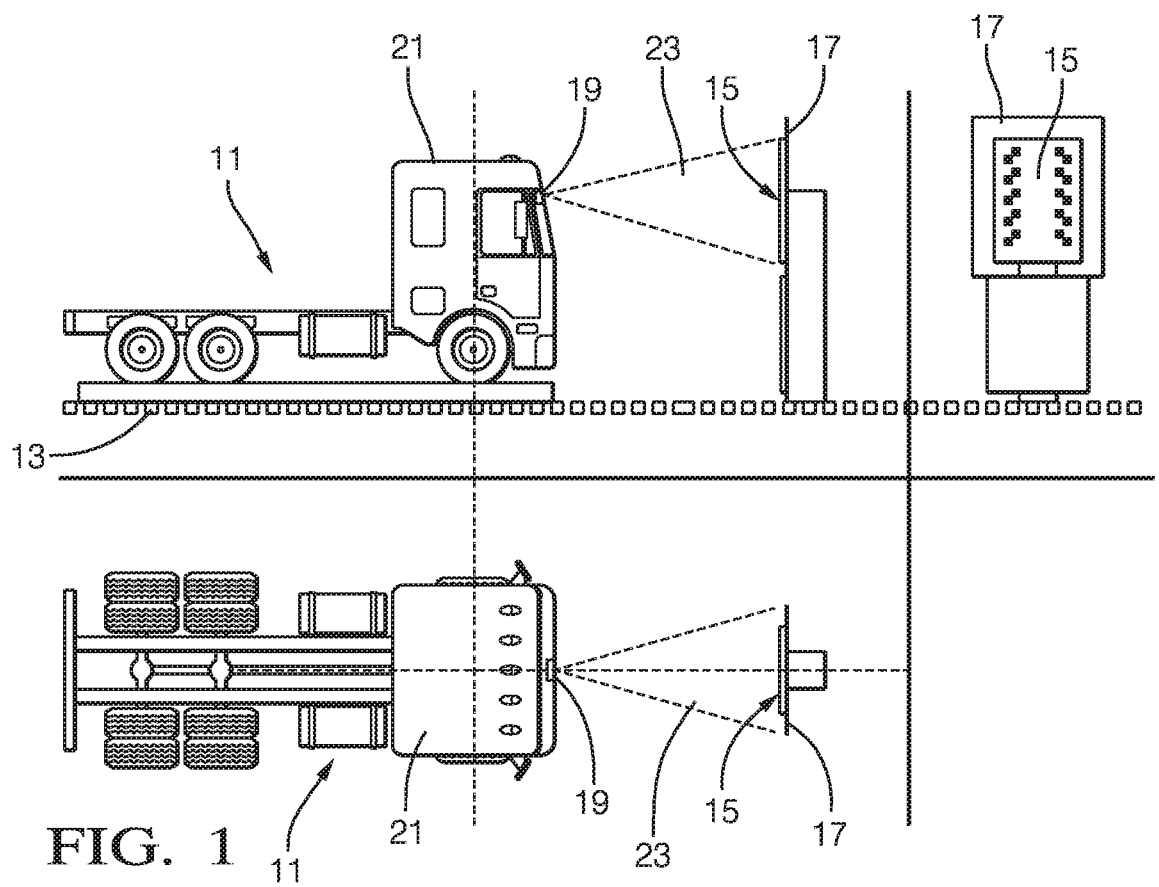
FIG. 1 is a camera calibration station in accordance with one embodiment.

FIG. 1 shows a truck 11 at the end of a production line which the truck 11 has run through for its production. The truck 11 is moved by a conveyor system 13 and placed in front of a calibration pattern 15 situated on an upright panel 17. A camera 19 is mounted to a driver cabin 21 of the truck 11. The camera 19 is located at a precise position relative to the driver cabin 21. But since the driver cabin 21 is softly supported, for example by means of an air suspension, the height of the camera 19 can vary and is therefore unknown. However, the truck 11 is placed such that the camera 19 has a known distance to the calibration pattern 15.

Figure 2:
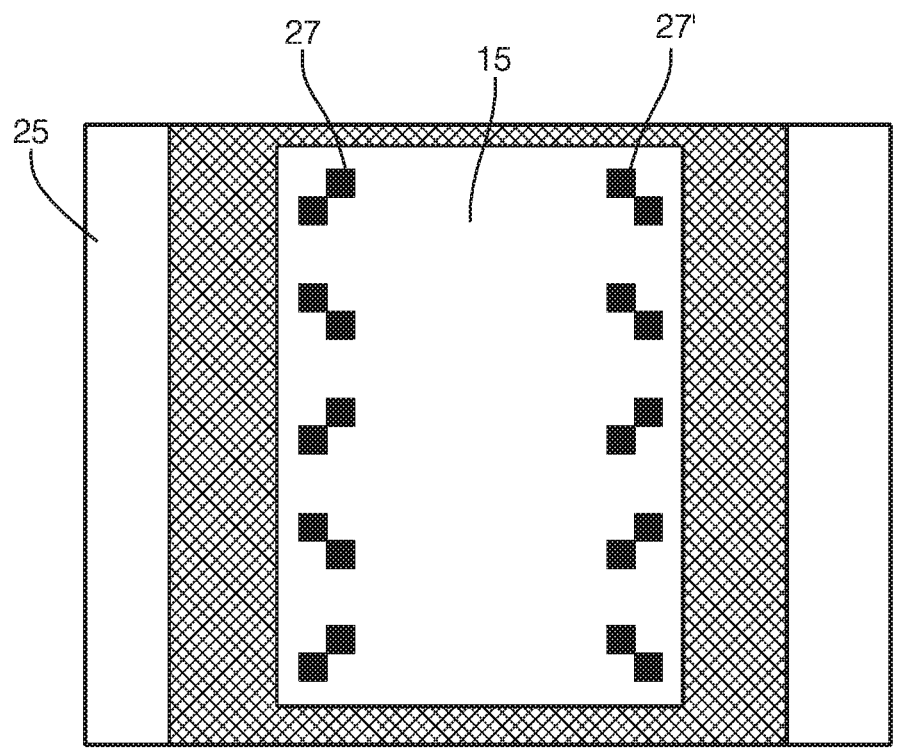
FIG. 2 is calibration target used in the station of FIG. 1 in accordance with one embodiment.

The camera 19 has a field of view 23 depending on the orientation of the camera 19. Since the orientation of the camera 19 can vary, it has to be calibrated. To this purpose, the camera 19 acquires an image 25 of the calibration pattern 15. An exemplary such image 25 is shown in FIG. 2.

The calibration pattern 15 comprises ten sub-patterns 27, 27', representations of which can be recognized in the image 25. There are sub-patterns of a first type 27 and sub-patterns of a second type 27'. The sub-patterns 27, 27' of both types are each formed by two equally oriented squares, with a corner of one of the squares coinciding with a corner of the other of the squares, wherein the relative orientation of the two squares of a respective sub-patterns of the first type 27 is perpendicular to the relative orientation of the two squares of a respective sub-pattern of the second type 27'.

Five of the sub-patterns 27, 27' are arranged along a first vertical line, the other five along a second vertical line. Each of the sub-patterns 27, 27' on the first vertical line forms a pair with a respective sub-pattern 27, 27' on the second vertical line such that both sub-patterns 27, 27' of a respective pair are aligned on a horizontal line. Hence, in total there are five horizontal lines. While the two vertical lines and the five horizontal lines are not depicted and hence are no explicit part of the calibration pattern, they are unambiguously defined by the sub-patterns 27, 27', in particular by respective central points of these sub-patterns 27, 27'.

Figure 3:
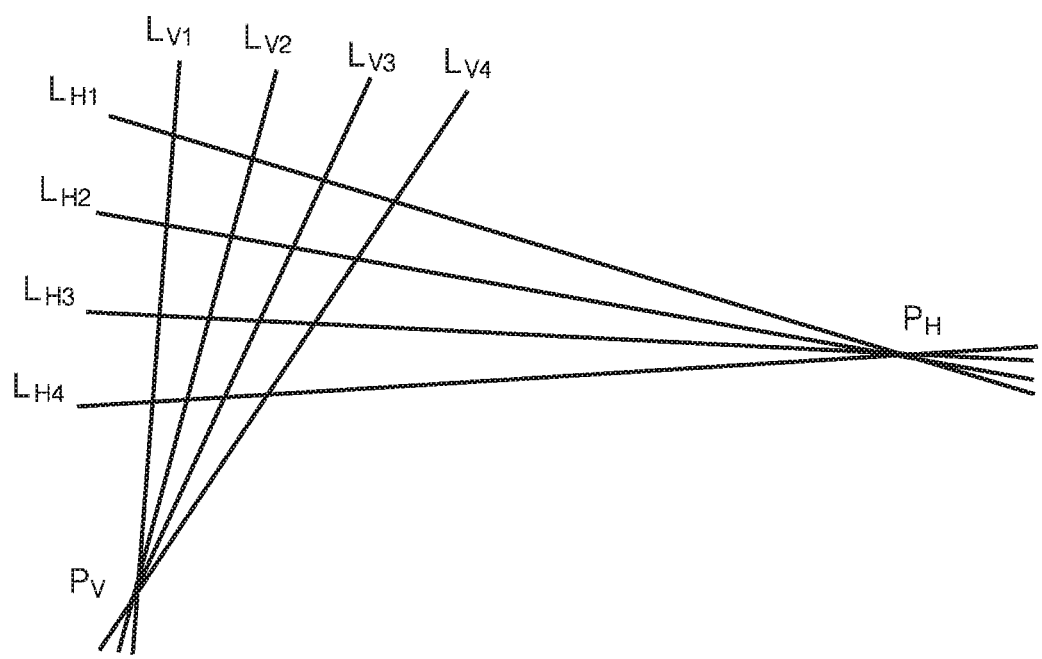
FIG. 3 is a diagram used for calibration a camera in accordance with one embodiment.

Due to roll, yaw and pitch of the camera 19, even after correction of the image 25 for lens distortions, optical aberrations or the like, the representations of the horizontal or vertical lines defined by the sub-patterns 27, 27' of the calibration pattern 15 within the image 25 are not parallel to each other. This is schematically shown in FIG. 3 for a set of four representations of horizontal lines denoted, LH1, LH2, LH3 and LH4, and a set four representations of vertical lines denoted, LV1, LV2, LV3 and LV4. It is to be noted that these representations of horizontal and vertical lines, respectively, have been derived from a different calibration pattern 15 than the one shown in FIGS. 1 and 2.

The representations of the horizontal lines LH1, LH2, LH3 and LH4 intersect at a horizontal vanishing point PH. If all four lines do not intersect at a single point, the vanishing point PH can be defined as an average point of the different pairwise intersections. In a corresponding manner a vertical vanishing point PV is determined from the intersections of the representations of the vertical lines LV1, LV2, LV3 and LV4.

After having determined the horizontal and/or the vertical vanishing point PH or PV, respectively, calculation of at least one of the roll angle, the yaw angle and the pitch angle of the camera 19 can be executed as described above, especially taking into account coordinates of these determined vanishing points.

Figure 4:
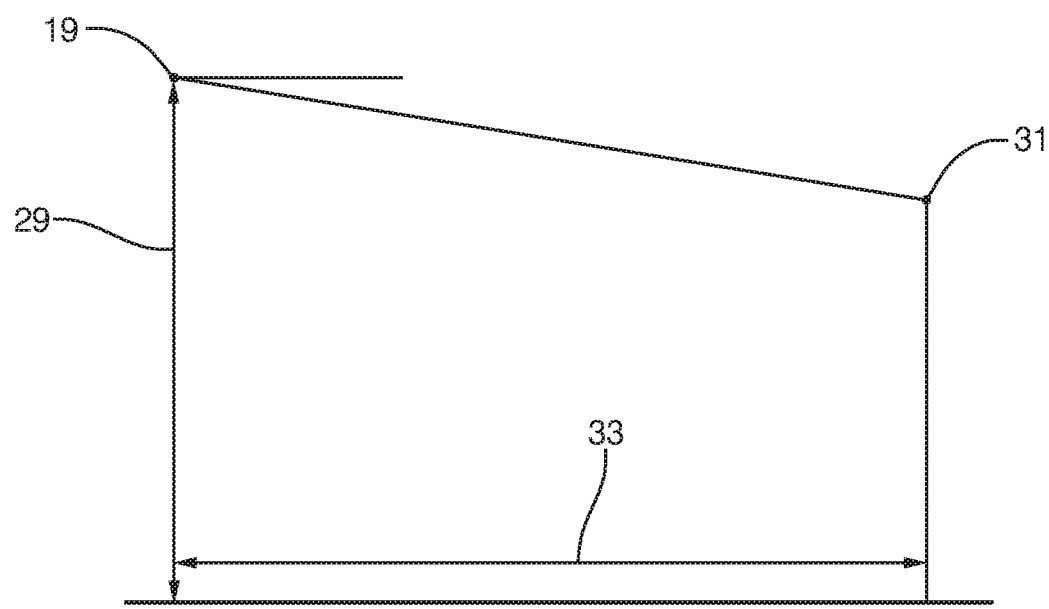
FIG. 4 is a diagram used for calibration a camera in accordance with one embodiment.

When the roll, yaw and pitch of the camera 19 are known, the image 25 can be corrected for these values so as to create a corrected image which corresponds to the image 25 as it would have looked (at least essentially), if acquired by the camera 19 in an orientation with zero roll, zero yaw and zero pitch. From this corrected image, then, a height 29 of the camera 19 and a lateral offset of the camera 19 relative to the calibration pattern 15 can be determined. This is schematically illustrated in FIG. 4 for the height 29.

The calibration pattern 15 contains a reference point 31, which might be the central point of one of the sub-patterns 27, 27' of the calibration pattern 15 or any otherwise characteristic point within the calibration pattern 15. The representation of this reference point 31 in the corrected image of the calibration pattern 15 has a certain coordinate in vertical direction which corresponds to a distance from a point of origin in the image. Since the distance 33 of the camera 19 to the calibration pattern 15, the distance being defined in a longitudinal direction perpendicular to the plane of the calibration pattern 15, is known, the coordinate can be converted into a real vertical distance of the reference point 31 to the camera 19. Since furthermore also the height of the reference point 31 is known, the height 29 of the camera 19 can be determined. Determination of the lateral offset of the camera 19 is done correspondingly.

The invention claimed is:

1. A method for calibrating the orientation of a camera mounted to a vehicle, in particular a truck, comprising the steps of
placing the camera in front of a calibration pattern defining at least two horizontal lines and two vertical lines;
acquiring an image of the calibration pattern with the camera, the image having a first axis and a second axis at least essentially corresponding to a horizontal axis and a vertical axis, respectively;
identifying, with a microcontroller in communication with the camera, representations of the horizontal lines and the vertical lines within the acquired image;
determining, with the microcontroller, a horizontal vanishing point from the representations of the horizontal lines;

determining, with the microcontroller, a vertical vanishing point from the representations of the vertical lines; and determining, with the microcontroller, a roll angle, wherein calculating the roll angle comprises determining an angle of the line segment defined by a horizontal vanishing point and a principal point of the image with respect to the first axis by calculating the inverse tangent of the quotient of a second coordinate of the horizontal vanishing point measured along the second axis and the first coordinate of the horizontal vanishing point;

determining, with the microcontroller, a yaw angle by calculating the inverse tangent of the quotient of a focal length of the camera and the product of a pixel pitch of the camera and the first coordinate of the horizontal vanishing point or of a corrected horizontal vanishing point;

determining, with the microcontroller, a pitch angle by calculating the inverse tangent of the quotient of a focal length of the camera and the product of a pixel pitch of the camera and the second coordinate of the vertical vanishing point or of a corrected vertical vanishing point; and adjusting, with the microcontroller, an orientation of the image acquired by the camera based on at least one of the roll angle, the yaw angle, and the pitch angle.

2. The method in accordance with claim 1, wherein the calibration pattern comprises at least a first characteristic point, a second characteristic point, a third characteristic point and a fourth characteristic point, with the two horizontal lines being defined by the first and second characteristic points and the third and fourth characteristic points, respectively, and the two vertical lines being defined by the first and third characteristic points and the second and fourth characteristic points, respectively.

3. The method in accordance with claim 1, wherein determining the horizontal vanishing point from the representations of the horizontal lines comprises determining a point of intersection of the horizontal lines, and determining the vertical vanishing point from the representations of the vertical lines comprises determining a point of intersection of the vertical lines.

4. The method in accordance with claim 1, wherein the corrected vertical vanishing point is determined by rotating a vertical vanishing point around a principal point of the image by negative of the roll angle.

5. The method in accordance with claim 4, wherein the second coordinate of the corrected vertical vanishing point is calculated as a sum of the product of the first coordinate of the vertical vanishing point and a sine of the negative of the roll angle and a product of the second coordinate of the vertical vanishing point and a cosine of the negative of the roll angle.

6. The method in accordance with claim 1, wherein the calibration pattern defines more than two horizontal lines or more than two vertical lines, representations of which are identified within the acquired image.

7. The method in accordance with claim 1, wherein the steps of acquiring the image of the calibration pattern, of identifying representations of the horizontal and vertical lines, of determining the horizontal and the vertical vanishing points and of calculating at least one of the roll angle, the yaw angle and the pitch angle are executed repeatedly such that at least one of a set of roll angles, a set of yaw angles and a set of pitch angles is obtained, the method further comprising the step of calculating at least one of an averaged roll angle, an averaged yaw angle and an averaged pitch angle by averaging the angles of the set of roll angles, the set of yaw angles or the set of pitch angles, respectively.

8. The method in accordance with claim 1, said method further comprising determining a lateral offset of the camera relative to the calibration pattern and a height of the camera by correcting the acquired image for at least one of roll, yaw and pitch, determining a first coordinate difference and a second coordinate difference between a principal point of the image and a representation of a reference point of the calibration pattern within the image, the reference point of the calibration pattern having a known horizontal and vertical position, and determining a lateral offset and the height of the camera by scaling a first coordinate difference and a second coordinate difference with a factor obtained by multiplying a known distance of the camera to the calibration pattern with a quotient of a pixel pitch of the camera and a focal length of the camera.

9. The method in accordance with claim 1, wherein the step of placing the camera in front of the calibration pattern is executed at an end of a production line which the vehicle the camera is mounted to has run through for its production.

10. A system for calibrating an orientation of a camera mounted to a vehicle, in particular a truck, the system comprising:

a camera placed in front of a calibration pattern defining at least two horizontal lines and two vertical lines;
the camera acquiring an image of the calibration pattern;
the image having a first axis and a second axis at least essentially corresponding to a horizontal axis and a vertical axis, respectively;

a microcontroller in communication with the camera, the microcontroller configured to:
identify representations of the horizontal lines and the vertical lines within the acquired image;
determine a horizontal vanishing point from the representations of the horizontal lines;
determine a vertical vanishing point from the representations of the vertical lines;
determine a roll angle, wherein calculating the roll angle comprises determining an angle of the line segment defined by a horizontal vanishing point and a principal point of the image with respect to the first axis by calculating the inverse tangent of the quotient of a second coordinate of the horizontal vanishing point measured along the second axis and the first coordinate of the horizontal vanishing point;
determine a yaw angle by calculating the inverse tangent of the quotient of a focal length of the camera and the product of a pixel pitch of the camera and the first coordinate of the horizontal vanishing point or of a corrected horizontal vanishing point; and
determine a pitch angle by calculating the inverse tangent of the quotient of a focal length of the camera and the product of a pixel pitch of the camera and the second coordinate of the vertical vanishing point or of a corrected vertical vanishing point; and
adjust an orientation of the image acquired by the camera based on at least one of the roll angle, the yaw angle, and the pitch angle.

11. The system in accordance with claim 10, wherein the calibration pattern comprises at least a first characteristic point, a second characteristic point, a third characteristic point and a fourth characteristic point, with the two horizontal lines being defined by the first and second characteristic points and the third and fourth characteristic points, respectively, and the two vertical lines being defined by the first and third characteristic points and the second and fourth characteristic points, respectively.

12. The system in accordance with claim 10, wherein determining the horizontal vanishing point from the representations of the horizontal lines comprises determining a point of intersection of the horizontal lines, and determining the vertical vanishing point from the representations of the vertical lines comprises determining a point of intersection of the vertical lines.

13. The system in accordance with claim 10, wherein the corrected vertical vanishing point is determined by rotating a vertical vanishing point around a principal point of the image by a negative of the roll angle.

14. The system in accordance with claim 13, wherein the second coordinate of the corrected vertical vanishing point is calculated as a sum of the product of the first coordinate of the vertical vanishing point and a sine of the negative of the roll angle and a product of the second coordinate of the vertical vanishing point and a cosine of the negative of the roll angle.

15. The system in accordance with claim 10, wherein the calibration pattern defines more than two horizontal lines or more than two vertical lines, representations of which are identified within the acquired image.

16. The system in accordance with claim 10, wherein the steps of acquiring the image of the calibration pattern, of identifying representations of the horizontal and vertical lines, of determining the horizontal and the vertical vanishing points and of calculating at least one of the roll angle, the yaw angle and the pitch angle are executed repeatedly such that at least one of a set of roll angles, a set of yaw angles and a set of pitch angles is obtained, the method further comprising the step of calculating at least one of an averaged roll angle, an averaged yaw angle and an averaged pitch angle by averaging the angles of the set of roll angles, the set of yaw angles or the set of pitch angles, respectively.

17. The system in accordance with claim 10, wherein the microcontroller is further configured to:
  determine a lateral offset of the camera relative to the calibration pattern and a height of the camera by:
    correcting the acquired image for at least one of roll, yaw and pitch;
    determining a first coordinate difference and a second coordinate difference between a principal point of the image and a representation of a reference point of the calibration pattern within the image, the reference point of the calibration pattern having a known horizontal and vertical position, and
    determining a lateral offset and the height of the camera by scaling a first coordinate difference and a second coordinate difference with a factor obtained by multiplying a known distance of the camera to the calibration pattern with a quotient of a pixel pitch of the camera and a focal length of the camera.

18. The system in accordance with claim 10, wherein placing the camera in front of the calibration pattern is executed at an end of a production line which the vehicle the camera is mounted to has run through for its production.

* * * * *